June 3, 1952 D. H. WESTWOOD 2,599,305

ELECTRIC PULSE DELAY CIRCUIT

Filed March 24, 1950

INVENTOR

David H. Westwood

BY J. L. Whittaker

ATTORNEY

Patented June 3, 1952

2,599,305

UNITED STATES PATENT OFFICE 2,599,305

ELECTRIC PULSE DELAY CIRCUIT

David H. Westwood, Haddonfield, N. J., assignor to Radio Corporation of America, a corporation of Delaware Application March 24, 1950, Serial No. 151,677

5 Claims. (Cl. 250—27)

My invention relates to electrical delay circuits and particularly to a circuit for producing an electrical pulse that may be delayed a variable amount.

An object of the invention is to provide an improved circuit for producing an electrical pulse of variable delay.

A further object of the invention is to provide an improved pulse delay circuit of the type wherein the amount of delay is determined by the setting of a clipping level for a wave of sawtooth wave form or of some other wave form having a sloping portion.

A still further object of the invention is to provide an improved delay circuit for producing a pulse that is delayed by an amount that is continuously varied.

A still further object of the invention is to provide an improved delay circuit for producing a delay circuit for producing a delayed pulse that remains of constant amplitude as the amount of delay is varied.

In practicing the present invention two vacuum tubes having a common cathode resistor are employed. A sawtooth wave of negative polarity is applied to the grid of the first tube and the delayed pulse is taken off the anode of the second tube.

The circuit adjustments are such that during a positive portion of the applied sawtooth wave and before the negative going portion begins the first tube is conducting and the second tube is biased to cut-off.

When the negative sawtooth wave is applied, the first tube is driven to cut-off at a time depending upon the bias setting for the first tube. This results in the second tube being driven to a conducting condition thereby lowering its anode potential to produce the front edge of the delayed pulse. The delayed pulse terminates during the return line period of the applied sawtooth voltage. While the timing of the back edge of the delayed pulse is not of interest in the example herein described, the circuit may be employed to utilize the back edge timing.

The invention will be better understood from the following description taken in connection with the accompanying drawing in which.

Figure 1:
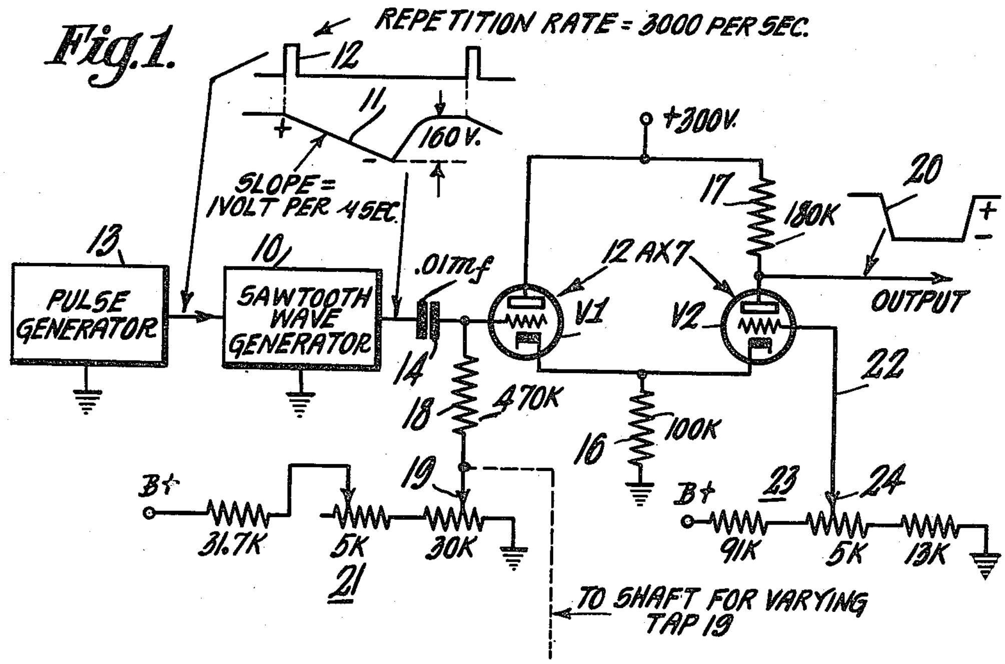
Figure 1 is a circuit diagram of a preferred embodiment of the invention.

Referring to Figure 1, a suitable sawtooth wave generator 10 supplies a sawtooth wave such as shown by the graph 11, for example. The sawtooth wave cycles are produced in synchronism with electrical pulses shown by graph 12 and supplied from a pulse generator 13. In the specific example illustrated the pulses 12 have a repetition rate of 3000 per second.

The sawtooth wave generator 10 may be any one of several well known types and requires no detailed description. If desired, the generator 10 may be a triangular wave generator. It will be apparent that the particular shape and values of the wave 11 are not critical and depend upon the design and application of a particular delay circuit.

The specific values indicated on the drawing, both as to the wave 11, the pulses 12, and the circuit constants are given merely for the purpose of illustrating one specific example.

The sawtooth wave 11 is applied with negative polarity through a coupling capacitor 14 to the grid of a vacuum tube V1. The tube V1 and a tube V2 have a common cathode resistor 16. In the example shown, the tubes V1 and V2 are each one half of a vacuum tube type 12AX7.

Anode potential is applied directly to the anode of the tube V1 whereby the tube V1 acts as a cathode follower. Anode potential is applied to the anode of the tube V2 through an anode resistor 17.

The delayed output pulse 20 is taken off the anode of tube V2.

Referring now to the grid biasing means for the two tubes, the tube V1 has bias voltage applied to its grid through a grid resistor 18. This bias voltage is supplied from a variable tap 19 on one section of a potentiometer 21. This potentiometer is connected across the anode voltage supply for the tubes V1 and V2. In the specific example shown, the potentiometer 21 consists of three resistor sections, the middle section being adjustable to permit adjusting the amount of phase change of the output pulse 20 for a given change in the position of the variable tap 19.

By varying the position of the tap 19 and thereby varying the bias on the tube V1, the timing of the front edge of the output pulse 20 is varied as will be explained hereinafter.

The tube V2 has bias applied to its grid by way of a lead 22. The bias is supplied from a potentiometer 23 that is connected across the anode supply of the tubes V1 and V2. In the specific example illustrated, the potentiometer 23 consists of three resistor sections, and the bias is taken off the middle section by a tap 24 that preferably is adjustable. In the preferred operation the tap 24 is not moved, after it is once adjusted.

Tap 19 determines the D.-C. operating level of the applied voltage wave, thus, the voltage on the grid at any particular time is the sum of the D.-C. voltage on tap 19 and the instantaneous value of the applied sawtooth wave referred to its average value. As previously stated, during a positive portion of the applied sawtooth wave and before the negative going portion begins, tube V1 is conducting and tube V2 is biased to cut-off. It will be noted that the flow of current from V1 through cathode resistor 16 makes the cathode of tube V2 positive with respect to its grid and thus biases tube V2 to cut-off. Under this condition the output voltage at the anode of tube V2 is a maximum and is equal to the plus B voltage, which, in this instance, is 300 volts. The tap 24 furnishes the bias to the grid of V2 and hence determines the voltage to which the cathode of V2 must be lowered in order to start anode to cathode conduction in V2.

Figure 2:
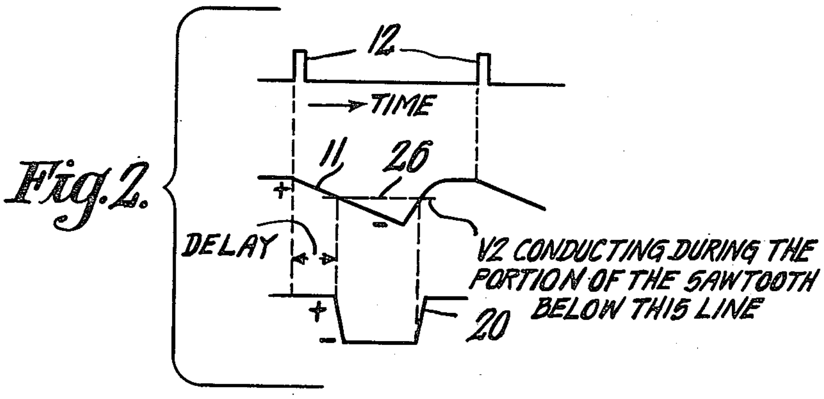
Figure 2 is a group of graphs that are referred to in explaining the operation of the circuit of Figure 1.

Now consider the circuit action when the negative going portion of the applied sawtooth wave 11 begins. Cathode follower action of V1 causes the voltage across cathode resistor 16 also to go more negative and finally a point is reached on the negative slope of 11 at which the cathode to grid voltage of V2 is such as to cause anode to cathode conduction in V2. This is indicated by the broken line in Figure 2. As a result of V2 becoming conducting its anode voltage drops thereby producing the front edge of the output pulse 20. When V2 is fully conducting the voltage across the cathode resistor 16 is held to a constant value near that of the grid voltage and determined by the tube characteristics of V2. As the voltage wave on the grid of V1 continues to go more negative the conduction through V1 is cut off. Thus the front edge of pulse 20 has been caused to occur at a time delayed, as indicated in Figure 2, by an amount determined both by the shape of the applied voltage wave and the relative value of bias voltages on taps 19 and 24.

Described differently the circuit action is thus: The bias voltage set by tap 24 determines the voltage necessary on the cathode of V2 to cause conduction in V2 while the bias voltage furnished by the tap 19 determines at which point on the applied wave this particular voltage is caused to occur on the cathode of V2 by the cathode follower action of V1. Therefore, as the tap 19 is varied the point on the applied wave at which V2 conducts is varied thus varying the delay of the leading edge of the output pulse.

The pulse 20 remains at a fixed reduced voltage value so long as the tube V2 conducts and the tube V1 remains cut-off. As the voltage of sawtooth wave 11 rises during the return period, a point is reached where tube V1 again becomes conducting and the tube V2 is again driven to cut-off. This produces the back edge of the pulse 20.

It should be noted that as the tap 19 is varied to vary the delay of output pulse 20, there is no change in the amplitude of the pulse 20 since the operating characteristics of the tube V2 remain unchanged. For some applications of the invention this is very important.

Where it is not important that the amplitude of the pulse 20 should remain constant, the tap 19 may be held fixed and the tap 24 varied to vary the delay of pulse 20. In that case the middle resistor section of the potentiometer 23 should comprise a greater percentage of the total potentiometer resistance than indicated on the drawing.

It will be understood that, if desired, the output pulse 20 may be differentiated to obtain a delayed and comparatively narrow pulse which will occur in response to the occurrence of the front edge of pulse 20. Or, if preferred, the front edge of pulse 20 may be used to trigger a multivibrator to produce delayed pulses of the desired width.

It will be apparent that the invention is not limited to the use of sawtooth or triangular waves on the grid of the tube V1. While a wave form having a linear portion usually is preferred, other wave forms such as a sine wave form may be employed in some instances.

It will be apparent that the timing of the back edge of the output pulse may be utilized particularly if the input wave is a triangular wave or if it is a sawtooth wave, for instance, that has a comparatively steep front slope and a gradual back slope or return.

The circuit values on the drawing are given merely by way of example and are in microfarads and thousands of ohms.

What I claim is:

1. In combination, means for producing a sawtooth wave having a gradual sloping portion that goes increasingly negative, a pair of vacuum tubes each having a cathode, a grid and an anode, an anode voltage supply, the first of said tubes being normally conducting, means for applying said wave to the grid of the first of said tubes with sufficient amplitude to drive said first tube to anode current cut-off, a cathode resistor common to said cathodes and through which said cathodes are connected to the low voltage end of said anode voltage supply, an anode resistor for the second of said tubes through which the high voltage end of said supply is connected to the anode of said one tube, said high voltage end also being connected to the anode of the other tube, means for taking a rectangular output wave off the anode end of said anode resistor, means for applying a bias voltage to the grid of one of said tubes, means for varying said bias whereby the starting time of said output wave is varied, whereby there is obtained a rectangular wave having a front edge that has a timing determined by the value of said bias.

2. In combination, means for producing a wave having a negative polarity portion that has substantially a linear slope, a first vacuum tube and a second vacuum tube each having a cathode, a grid and an anode, an anode voltage supply, said first tube being normally conducting, means for applying said wave to the grid of said first tube with sufficient amplitude to drive said first tube to anode current cut-off, a cathode resistor common to said cathodes and through which said cathodes are connected to the low voltage end of said anode voltage supply, an anode resistor for the second of said tubes through which the high voltage end of said supply is connected to the anode of said one tube, said high voltage end being connected directly to the anode of the other tube, means for taking a rectangular output wave off the anode of said second tube, means for applying a bias voltage to the grid of said first tube, and means for varying said bias whereby the starting time of said output wave is varied.

3. A circuit for producing delayed pulses, said circuit comprising a pair of vacuum tubes each having a cathode, a control grid and an anode, said tubes having a common cathode resistor, the first of said tubes having a positive operating voltage applied directly to its anode whereby it functions as a cathode follower tube, the second of said tubes having an anode resistor through which a positive operating voltage is applied to its anode, an output connection from the anode end of said anode resistor for supplying a delayed output pulse, means for applying bias voltages to the control grids of said tubes such that the first tube is normally conducting and the second tube is normally biased to cut-off, means for applying to the grid of the first tube a voltage for driving it increasingly negative and sufficiently negative to drive said first tube beyond cut-off, said bias on at least one of said tubes being variable for varying the delay of said output pulse with respect to the starting time of said voltage that is applied to the grid of the first tube.

4. A circuit for producing delayed pulses, said circuit comprising a pair of vacuum tubes each having a cathode, a control grid and an anode, said tubes having a common cathode resistor, the first of said tubes having a positive operating voltage applied directly to its anode whereby it functions as a cathode follower tube, the second of said tubes having an anode resistor through which a positive operating voltage is applied to its anode, an output connection from the anode end of said anode resistor for supplying a delayed output pulse, means for applying bias voltages to the control grids of said tubes such that the first tube is normally conducting and the second tube is normally biased to cut off, means for applying to the grid of the first tube a voltage for periodically driving it increasingly negative and sufficiently negative to drive said first tube beyond cut-off, said bias on said first tube being variable for varying the delay of said output pulse with respect to the starting time of said voltage that is applied to the grid of the first tube.

5. A circuit for producing delayed pulses, said circuit comprising a pair of vacuum tubes each having a cathode, a control grid and an anode, said tubes having a common cathode resistor, the first of said tubes having a positive operating voltage applied directly to its anode whereby it functions as a cathode follower tube, the second of said tubes having an anode resistor through which a positive operating voltage is applied to its anode, an output connection from the anode end of said anode resistor for supplying a delayed output pulse, means for applying bias voltages to the control grids of said tubes such that the first tube is normally conducting and the second tube is normally biased to cut-off, means for applying to the grid of the first tube a negative sawtooth voltage for periodically driving it increasingly negative and sufficiently negative to drive said first tube beyond cut-off, said bias on the first of said tubes being variable for varying the delay of said output pulse with respect to the starting time of said voltage that is applied to the grid of the first tube.

DAVID H. WESTWOOD.

REFERENCES CITED

The following references are of record in the file of this patent:

UNITED STATES PATENTS

| Number | Name | Date |
|---|---|---|
| 2,466,044 | Schoenfeld | Apr. 5, 1949 |
| 2,471,268 | Gaines | May 24, 1949 |